United States Patent [19]

Yasue et al.

[11] Patent Number: 5,204,418

[45] Date of Patent: Apr. 20, 1993

[54] LIGHT-WEIGHT POLYESTER FILM AND PROCESS FOR ITS PRODUCTION

[75] Inventors: Kenji Yasue; Eiji Y. Yamamoto; Katsuyuki Toma; Minoru Kishida; Yoshiaki Kozuka, all of Uji, Japan

[73] Assignee: Unitika Ltd., Amagasaki, Japan

[21] Appl. No.: 828,146

[22] Filed: Jan. 30, 1992

[30] Foreign Application Priority Data

Jan. 31, 1991 [JP] Japan ................................. 3-032238

[51] Int. Cl.$^5$ ............................................. C08F 20/00
[52] U.S. Cl. .................................... 525/445; 528/272;
528/298; 528/300; 528/301; 528/302; 528/307;
528/308; 528/308.6; 528/310; 528/322;
528/329.1; 525/437; 525/444; 525/448;
525/539; 525/540; 525/88; 264/176.1;
264/210.5; 264/210.7; 264/211.12; 264/211.17
[58] Field of Search ................ 528/272, 298, 300, 301,
528/302, 307, 308, 308.6, 310, 322, 329.1;
525/437, 444, 445, 448, 539, 540, 88; 264/176.1,
210.5, 210.7, 211.12, 211.17

[56] References Cited

U.S. PATENT DOCUMENTS 4,388,446 6/1983 Hornbaker et al. ................. 525/175

*Primary Examiner*—John Kight, III
*Assistant Examiner*—Sam A. Acquah
*Attorney, Agent, or Firm*—Oblon, Spivak, McClelland, Maier & Neustadt

[57] ABSTRACT

A light-weight polyester film which comprises (A) from 50 to 95% by weight of a crystalline polyester resin and (B) from 5 to 50% by weight of a maleimide copolymer, said maleimide copolymer being dispersed in the film in the form of particles having diameters of from 0.1 to 20 μm and fine voids being present in the film, and which has an apparent specific gravity of from 0.3 to 1.1, wherein said maleimide copolymer comprises from 30 to 50 mol % of a maleimide monomer group, from 30 to 70 mol % of an aromatic vinyl monomer group, from 0 to 40 mol % of an unsaturated dicarboxylic anhydride monomer group and from 0 to 40 mol % of other copolymerizable monomer group, and said maleimide copolymer has a glass transition temperature higher by at least 10° C. than the crystalline polyester resin.

10 Claims, No Drawings

LIGHT-WEIGHT POLYESTER FILM AND PROCESS FOR ITS PRODUCTION

The present invention relates to a polyester film of a low density containing fine voids and being excellent in the strength, heat resistance, shielding properties and writability, and a process for its production. By virtue of its excellent properties, the light-weight polyester film of the present invention is useful for labels, information paper, drawing paper, printing paper, etc.

As an attempt to reduce the weight of a polyester film, (a) a method of adding a gas or a gasifiable substance (e.g. Japanese Unexamined Patent Publication No. 38765/1975, Japanese Examined Patent Publication No. 46456/1982 and Japanese Unexamined Patent Publication No. 34931/1982), (b) a method of adding a substance which is capable of generating a gas by a chemical reaction (e.g. Japanese Unexamined Patent Publication No. 43871/1977 and Japanese Examined Patent Publication No. 50625/1983) or (c) a method of adding a substance soluble in a solvent and subsequently extracting it with the solvent (e.g. Japanese Unexamined Patent Publication No. 34963/1976 and Japanese Examined Patent Publication No. 27666/1977) has been known.

However, none of these methods is practically employed. The reason is such that although it is possible to form voids in a polyester film by these methods, it is very difficult to control their size, and not only large voids are likely to form, but also their spacial distribution tends to be non-uniform. Accordingly, very weak portions are likely to be present in the polyester film, and when such a film is stretched, the film is likely to rapture. Further, films obtainable by such methods were not satisfactory with respect to their weight reduction, strength, shielding properties, writability or uniformity of the properties.

Further, a method has been proposed in which a composition having a void-forming polymer incorporated to a polyester resin, is melt-extruded to obtain an unstretched film, which is then stretched to form voids (e.g. Japanese Unexamined Patent Publications No. 168441/1980 and No. 235942/1991). As specific examples of such a void-forming polymer, polypropylene, polyethylene, polymethyl methacrylate, polymethylpentene, polyphenylene sulfide, polyphenylene oxide and crystalline polyester are mentioned.

In this method, the void-forming polymer is dispersed in the polyester film in the form of fine particles, and the particle size of the dispersed particles depends on the affinity of the void-forming polymer and the polyester and the difference in their melt viscosities. When the unstretched film of this composition is stretched at least monoaxially, peeling occurs at the interface between the polyester and the void-forming polymer dispersed in the form of fine particles, whereby voids will be formed. The degree of formation of the voids depends not only on the stretching conditions but also on the glass transition temperature of the void-forming polymer and the affinity between the polyester and the void-forming polymer. This method for obtaining a light-weight polyester film by incorporating such a void-forming polymer is a better method without the drawbacks pointed out with respect to the above methods (a), (b) and (c). However, the properties of light-weight polyester films obtained by using the above mentioned specifically proposed polymers as the void-forming polymer, are not yet fully satisfactory.

For example, when a polymer having a relatively low glass transition temperature such as polypropylene, polystyrene, polymethyl methacrylate or polymethylpentene is used as the void-forming polymer, the melt viscosity of such a void-forming polymer is low at the temperature for melt extrusion of the polyester resin, whereby the void-forming polymer in an unstretched film obtained by melt-extruding the composition tends to be rod-shaped particles oriented in the flow direction of the polyester due to the shearing stress during the melt extrusion and is hardly dispersible in the form of spherical particles. Thus, both the unstretched film and the stretched film made of such a composition have a problem that their anisotropy is substantial. Further, if the unstretched film made of such a composition is stretched at a temperature higher than the glass transition temperature of the polyester resin, the dispersed void-forming polymer is likely to undergo plastic deformation, and formation of voids tends to be impaired, since the glass transition temperature of the void-forming polymer is low. Besides, the degree of fine roughness on the stretched film surface tends to be inadequate. Thus, the film made of such a composition is not satisfactory with respect to the weight reduction, shielding properties or writability. Further, a problem has been pointed out that since the glass transition temperature of the void-forming polymer is low, the film made of such a composition tends to undergo property changes at a temperature exceeding the glass transition temperature.

On the other hand, when polyphenylene sulfite or polyphenylene oxide is used as the void-forming polymer, such a polymer does not have the above mentioned problems since it has a relatively high glass transition temperature. However, since these polymers are very poor in the affinity to polyester, there will be another problem. Namely, if an unstretched film made of such a composition, is stretched, excessive peeling occurs at the interface between the polyester and the void-forming polymer dispersed in the form of fine particles, thus leading to rapture of the film upon further progress of the peeling. Even when the film does not rapture, there is a problem that the film strength is poor. Further, polyphenylene sulfite and polyphenylene oxide are colored by themselves, and films made of such compositions have a drawback that they are poor in whiteness.

The method wherein liquid crystalline polyester is used as the void-forming polymer has the problem resulting from the fact that the void-forming polymer tends to be rod-shaped particles oriented in the flow direction of the unstretched film and the problem resulting from the fact that the affinity to polyester is very poor. Further, it is inferior in whiteness.

As described above, a light-weight polyester film having satisfactory properties has not been obtained also by the method of incorporating a void-forming polymer to the polyester resin, since no suitable void-forming polymer has been found.

Under these circumstances, it is an object of the present invention to find a void-forming polymer having a suitable affinity to polyester and a suitable difference in the melt viscosity from the polyester and to prepare a polyester film of a low density excellent in the strength, heat resistance, shielding properties and writability by using it, and to provide a process for producing such a polyester film.

The present inventors have conducted an extensive research to accomplish such an object, and as a result, have found it possible to accomplish the object by a polyester film made of a composition comprising (A) a crystalline polyester resin and (B) a maleimide copolymer and having a specific structure. The present invention has been accomplished on the basis of this discovery.

Thus, the present invention provides a light-weight polyester film which comprises (A) from 50 to 95% by weight of a crystalline polyester resin and (B) from 5 to 50% by weight of a maleimide copolymer, said maleimide copolymer being dispersed in the film in the form of particles having diameters of from 0.1 to 20 μm and fine voids being present in the film, and which has an apparent specific gravity of from 0.3 to 1.1, wherein said maleimide copolymer comprises from 30 to 50 mol % of a maleimide monomer group, from 30 to 70 mol % of an aromatic vinyl monomer group, from 0 to 40 mol % of an unsaturated dicarboxylic anhydride monomer group and from 0 to 40 mol % of other copolymerizable monomer group, and said maleimide copolymer has a glass transition temperature higher by at least 10° C. than the crystalline polyester resin.

The present invention also provides a process for producing such a light-weight polyester film, which comprises melt extruding a composition comprising (A) from 50 to 95% by weight of a crystalline polyester resin and (B) from 5 to 50% by weight of a maleimide copolymer to obtain an unstretched polyester film, and at least monoaxially stretching the polyester film at least 1.5 times within a temperature range of at least the glass transition temperature of the crystalline polyester resin and at most the crystallization temperature of the crystalline polyester resin.

In the present invention, the crystalline means that the heat of fusion of crystals as measured by means of a differential thermal analyzer at a temperature raising rate of 20° C./min is at least 1 cal/g. The crystallization temperature is defined to be a crystallization temperature peak as measured likewise by means of a differential thermal analyzer at a temperature raising rate of 20° C./min. The glass transition temperature means a freezing initiation temperature of the thermal motion of the polymer main chain as commonly defined. This glass transition temperature can be measured also by means of a differential thermal analyzer.

The crystalline polyester resin to be used in the present invention is a polyester comprising residues of an aromatic dicarboxylic acid and residues of an aliphatic diol or an alicyclic diol, as main constituting components.

Typical examples of the aromatic dicarboxylic acid include terephthalic acid, isophthalic acid and naphthalenedicarboxylic acid. The aromatic rings of these aromatic dicarboxylic acids may be substituted by halogens, alkyl groups or other substituents.

Typical examples of the aliphatic diol or the alicyclic diol include ethylene glycol, diethylene glycol, propylene glycol, butylene glycol, neopentyl glycol and cyclohexylene dimethanol. These aromatic dicarboxylic acids, alicyclic diols and/or alicyclic diols may, respectively be used as a mixture of two or more of them.

In the present invention, particularly preferred crystalline polyester resins include polyethylene terephthalate (PET), polybutylene terephthalate (PBT), polyethylene naphthalate (PEN) and polycyclohexylenedimethylene terephthalate (PCT). The glass transition temperatures (Tg), the crystallization temperatures (Tc) and the crystal fusion temperatures (Tm) of these crystalline polyester resins measured by means of a differential thermal analyzer, are as follows:

|     | Tg (°C.) | Tc (°C.) | Tm (°C.) |
| --- | --- | --- | --- |
| PET | 40 | 160 | 263 |
| PBT | 45 | 130 | 220 |
| PEN | 115 | 220 | 272 |
| PCT | 90 | 180 | 295 |

In the present invention, two or more of such crystalline polyester resins may be used in combination as a mixture. Further, a crystalline polyester resin having other components copolymerized, may be employed.

Such a crystalline polyester resin can be prepared by a method wherein an aromatic dicarboxylic acid and an aliphatic diol and/or an alicyclic diol are directly reacted. Otherwise it can be prepared by a method wherein an alkylester of an aromatic dicarboxylic acid and an aliphatic diol and/or an alicyclic diol are subjected to an ester exchange reaction followed by polycondensation, or a diglycol ester of an aromatic dicarboxylic acid is subjected to polycondensation.

There is no particular restriction as to the molecular weight of the crystalline polyester resin to be used in the present invention, so long as it is capable of forming a film. However, it is preferred that the inherent viscosity as measured at 25° C. in a solvent mixture of phenol/tetrachloroethane = 1:1 (weight ratio) is at least 0.4 (dl/g).

The maleimide copolymer to be used in the present invention comprises a maleimide monomer group and an aromatic vinyl monomer group, and if necessary, an unsaturated dicarboxylic anhydride monomer group and other copolymerizable monomer group, and it has a glass transition temperature higher by at least 10° C. than the crystalline polyester resin constituting the composition.

Typical examples of the maleimide monomer include maleimide, N-methylmaleimide, N-ethylmaleimide, N-propylmaleimide, N-hexylmaleimide, N-cyclohexylmaleimide, N-phenylmaleimide, N-tolylmaleimide, N-(halogenated phenyl)maleimide, N-(alkylphenyl)maleimide, N-(nitrophenyl)maleimide, N-(hydroxyphenyl)maleimide, N-naphthylmaleimide, α-chloro-N-phenylmaleimide and α-methyl-N-phenylmaleimide.

Typical examples of the aromatic vinyl monomer include styrene, α-methylstyrene, vinyl toluene, t-butylstyrene and halogenated styrene.

Typical examples of the unsaturated dicarboxylic anhydride monomer include maleic anhydride, methylmaleic anhydride, 1,2-dimethylmaleic anhydride, ethylmaleic anhydride and phenylmaleic anhydride.

As examples of said other copolymerizable monomer, acrylic monomers may be mentioned. Typical examples thereof include methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate, hydroxyethyl (meth)acrylate, methoxyethyl (meth)acrylate and glycidyl (meth)acrylate. Here, (meth)acrylate represents acrylate and methacrylate.

The maleimide copolymer to be used in the present invention comprises from 30 to 50 mol % of the maleimide monomer group, from 30 to 70 mol % of the aromatic vinyl monomer group, from 0 to 40 mol % of the unsaturated dicarboxylic anhydride monomer group and from 0 to 40 mol % of said other copolymerizable monomer group.

If the maleimide monomer group is less than 30 mol % or the aromatic vinyl monomer group exceeds 70 mol %, the glass transition temperature of the maleimide copolymer tends to be low, and the affinity to the crystalline polyester resin tends to be poor, such being undesirable.

On the other hand, if the maleimide monomer group exceeds 50 mol %, and the aromatic vinyl monomer group is less than 30 mol %, it tends to be difficult to produce a homogeneous copolymer on an industrial scale.

If the unsaturated dicarboxylic anhydride monomer group exceeds 40 mol %, or said other copolymerizable monomer group exceeds 40 mol %, the glass transition temperature of the maleimide copolymer tends to be low, and the thermal stability of the composition with the crystalline polyester resin tends to be poor, such being undesirable.

For the maleimide copolymer to be used in the present invention, two or more different types of the respective copolymer components may be used in combination as a mixture, or other different monomers may be copolymerized.

The maleimide copolymer to be used in the present invention can be prepared by a conventional radical polymerization method. As another method for preparing the maleimide copolymer, a method may be mentioned in which a copolymer of the unsaturated dicarboxylic anhydride monomer and the aromatic vinyl monomer, if necessary, together with other copolymerizable monomer, is reacted with ammonia or a primary amine to convert all or a part of acid anhydride groups to imide groups.

The maleimide copolymer to be used in the present invention has a glass transition temperature higher by preferably at least 10° C., more preferably at least 20° C., than the crystalline polyester resin. If the glass transition temperature of the maleimide copolymer is equal to or lower than that of the crystalline polyester resin, when a film made of such a composition is stretched, the maleimide copolymer tends to undergo plastic deformation, whereby formation of voids will be impaired. Besides, the degree of fine roughness on the surface of the stretched film tends to be inadequate. In a case where a maleimide copolymer having a low glass transition temperature is employed, the weight reduction, shielding properties and writability of the resulting stretched polyester film tend to be unsatisfactory.

There is no particular restriction as to the molecular weight of the maleimide copolymer to be used in the present invention, so long as it gives a melt viscosity of at least 1/10 of the melt viscosity of the crystalline polyester resin at a temperature for the melt extrusion of the composition.

The composition constituting the light-weight polyester film of the present invention comprises from 50 to 95% by weight of the crystalline polyester resin as component (A) and from 5 to 50% by weight of the maleimide copolymer as component (B).

If the amount of the maleimide copolymer as component (B) is less than 5% by weight, the amount of fine voids formed in the obtained final stretched polyester film will be small, and the weight reduction, shielding properties and writability tend to be inadequate. On the other hand, if it exceeds 50% by weight, the strength of the film tends to be low, the film is likely to rapture during the stretching operation, and the thermal stability during the melt extrusion of the composition tends to be poor, whereby thermal decomposition or the like is likely to occur.

In the light-weight polyester film of the present invention, the maleimide copolymer as component (B) is dispersed in the form of particles having a diameter of from 0.1 to 20 μm in the matrix composed of the crystalline polyester resin as component (A). Here, the fine particles of the maleimide copolymer are preferably as spherical as possible. In the case of spherical particles, anisotropy of the film scarcely occurs, and uniform voids will be formed by stretching, whereby a film having excellent strength will be obtained.

If the particle size of the fine particles of the maleimide copolymer is less than 0.1 μm, the amount of voids formed in the stretched polyester film will be small, whereby the weight reduction, shielding properties and writability tend to be inadequate. On the other hand, if it exceeds 20 μm, the strength of the film tends to be low, and the film is likely to rapture during the stretching, although the amount of voids formed will be large and the weight reduction and shielding properties will be adequate.

As described above, formation of voids depends not only on the conditions for stretching the film and the glass transition temperature of the void-forming polymer but also on the affinity of the void-forming polymer constituting the fine particles to the crystalline polyester resin constituting the matrix. If the affinity is to high, no void or no substantial void will be formed even when the film is stretched. On the other hand, if the affinity is too low, large voids are likely to be formed, whereby the film is likely to rapture during the stretching, and the strength of the resulting stretched film tends to be low. Accordingly, the void-forming polymer is required to have a suitable affinity to the crystalline polyester resin in order to obtain a light-weight polyester film having satisfactory properties.

The maleimide copolymer to be used as the void-forming polymer in the present invention is the one which satisfies such requirements, as it is produced by polymerizing the maleimide monomer group and the aromatic vinyl monomer group in a certain specific copolymerization ratio.

In the present invention, the unstretched film is obtained by melt-extruding a composition comprising (A) the crystalline polyester resin and (B) the maleimide copolymer. In this case, (A) the crystalline polyester resin and (B) the maleimide copolymer may preliminarily be melt-kneaded by means of e.g. an extruder to obtain pellets of the composition, which are then melt-extruded to obtain an unstretched film. Otherwise, (A) the crystalline polyester resin and (B) the maleimide copolymer may be blended, and the blend is directly melt-extruded to obtain an unstretched film. The temperature for melt extrusion is usually selected within a range of from the crystal fusion temperature of the crystalline polyester resin to 50° C. higher than the fusion temperature. The molten composition is extruded from e.g. a T-dye or a circular dye and cooled to a temperature lower than the glass transition temperature of the crystalline polyester resin to obtain a substantially amorphous film. There is no substantial formation of voids in this unstretched film, and the film is transparent or translucent in many cases.

Then, this unstretched film is stretched in at least monoaxial direction. The stretching is conducted at a temperature within a range of from the glass transition temperature of the crystalline polyester resin to the crystallization temperature thereof. By the stretching within this temperature range, the crystalline polyester constituting the matrix will be oriented and crystallized, and at the same time, voids will be effectively formed at the interface between the crystalline polyester and the maleimide copolymer constituting the fine particles. The stretching ratio gives a substantial influence over the properties of the resulting film. The larger the stretching ratio, the more the improvement in the weight reduction, shielding properties and strength of the film. The stretching ratio may be selected depending upon the particular purpose. However, in order to accomplish the object of the present invention it is necessary to stretch the film at least monoaxially at a stretching ratio of at least 1.5 times. Further, the film may be biaxially stretched. In this case, it is possible to further improve the properties. Also in this case, it is preferred to stretch the film at a stretching ratio of at least 1.5 times in each direction.

After stretching, the polyester film may be subjected to heat setting as the case requires. By this treatment, the dimensional stability of the stretched polyester film will be further improved. Usually, such heat setting is conducted at a temperature lower by from about 10° C. to 30° C. than the crystal fusion temperature of the crystalline polyester resin.

By the stretching of the unstretched polyester film, the apparent specific gravity of the film is brought to a level of not more than 1.1. By further increasing the stretching ratio, the apparent specific gravity can be made to a level of not more than 0.3. However, there will be a decrease in the strength and the productivity of the stretched film. Therefore, the apparent specific gravity of the light-weight polyester film is preferably within a range of from 0.3 to 1.1. The most preferred range of the apparent specific gravity from the viewpoint of the productivity and the properties is from 0.5 to 1.0.

To the composition of the present invention, other polymers may be incorporated, as the case requires, to an extent not to substantially impair the properties. Such other polymers include, for example, polyethylene, polypropylene, polystyrene, polymethylpentene, polymethyl methacrylate, ABS resin, polycarbonate, polyamide, polyphenylene oxide, polyallylate, polyethylene glycol, polysulfone, polyether sulfone, polyether ether ketone, polyphenylene sulfide, phenoxy resin, polyvinyl chloride, polyvinylidene chloride, liquid crystalline polyester, fluorine resin, phenol resin, melamine resin, urea resin and epoxy resin.

To the composition of the present invention, an inorganic filler or pigment such as silica, titanium oxide, calcium carbonate, alumina, kaolin, mica or talc, may be incorporated as the case requires to such an extent not to substantially impair the properties.

Further, other additives may also be incorporated. Such additives include, for example, an antioxidant, a heat resisting agent, an antistatic agent, a ultraviolet absorber, a lubricant and a colorant.

The light-weight polyester film of the present invention may be used by itself or after being subjected to treatment such as coating, printing or metallizing, as a packing material, labels, information paper, drawing paper, printing paper or the like. The light-weight polyester film of the present invention can also be used as a component constituting a multi-layered structure. Such a multi-layered structure includes, for example, a laminate film, a double-layered sheet and a composite.

Now, the present invention will be described in further detail with reference to Examples. However, it should be understood that the present invention is by no means restricted to such specific Examples. In the following description, "parts" and "%" mean "parts by weight" and "% by weight", respectively.

The maleimide copolymer used in the Examples was prepared in such a manner that about 100 parts of styrene, about 67 parts of maleic anhydride, 0.2 part of benzoyl peroxide and 300 parts of methyl ethyl ketone were reacted in a nitrogen atmosphere at 80° C. for 10 hours, and the obtained polymer was reacted with 1.2 parts of triethylamine and 46.2 parts of aniline at 130° C. for 6 hours to obtain a maleimide copolymer (a-3). Other maleimide copolymers were prepared in a similar manner.

The constituting components of the maleimide copolymer compositions used in the Examples are as shown in Table 1.

TABLE 1

| | Monomer composition (mol %) | | | |
|---|---|---|---|---|
| | Aromatic vinyl monomer | Maleimide monomer | Unsaturated dicaroxylic anhydride | Copolymerizable monomer |
| a-1 | Styrene 30 | N-phenylmaleimide 50 | | Methyl methacrylate 20 |
| a-2 | Styrene 50 | N-phenylmaleimide 50 | | |
| a-3 | Styrene 60 | N-phenylmaleimide 40 | | |
| a-4 | Styrene 50 | N-phenylmaleimide 30 | Maleic anhydride 20 | |
| a-5 | Styrene 40 | N-phenylmaleimide 60 | | |
| a-6 | Styrene 80 | N-phenylmaleimide 20 | | |
| a-7 | Styrene 30 | N-phenylmaleimide 10 | Maleic anhydride 60 | |
| a-8 | Styrene 10 | N-phenylmaleimide 30 | | Methyl methacrylate 60 |
| a-9 | Vinyl toluene 50 | N-phenylmaleimide 50 | | |
| a-10 | Styrene 50 | N-tolylmaleimide 50 | | |

The crystalline polyester resins used in the Examples are as shown in Table 2.

TABLE 2

| | Crystalline polyester resin | Intrinsic viscosity ($\eta$) |
|---|---|---|
| b-1 | Polyethylene terephthalate | 0.78 |
| b-2 | Polyethylene naphthalate | 0.68 |

Measuring methods used in the Examples are as follows.

1. Particle size:

Using JSM-15 model scanning electron microscope manufactured by Nippon Denshi K.K., the size is read from the electron microscopic photograph of the cross sectional surface of a specimen.

2. Specific gravity:

Measured by an underwater substitution method in accordance with JIS K-6758.

3. Surface roughness:

Measured in accordance with the method of JIS B-0601-1976 by means of a surface roughness meter SE-3AK Model, manufactured by Kosaka Kenkyusho K.K. Feeler diameter: 2 mm, feeler pressure: 10 mg.

4. Haze (Hz), parallel light ray transmittance (Tp):

Measured in accordance with ASTM D1003-61 by means of a haze meter, manufactured by Tokyo Denshyoku K.K.

5. G%:

The gloss was measured at an incident angle of 20° using Gloss Meter GM 30 Model, manufacture by Murakami Shikisai Gijutsu Kenkyukyo K.K.

6. Whiteness:

Measured by means of SM-4 Model color difference meter manufactured by Suga Shikenki.

7. Strength (tensile strength):

Measured in accordance with ASTM D882 by means of DSS-500 Model autograph manufactured by Simadzu Corporation, and represented by an average value in the longitudinal and transverse directions.

8. Writability:

Using a pencil "Uni" for a pencil hardness test, manufactured by Mitsubishi Enpitsu K.K., letters were written under a pressing pressure of 500 g, whereupon evaluation was made by the following standards:

◯: Letters were darkly written.
◉: Letters were very darkly written.
x: Letters were faintly written.

EXAMPLES 1 TO 9

Maleimide copolymer pellets having the water content reduced to 0.001 % by vacuum drying at 120° C. for 48 hours by means of a direct heating type vacuum dryer manufactured by Tabai K.K. and polyethylene terephthalate pellets having an intrinsic viscosity of 0.78 were mixed by a Henshel mixer, and the mixture was melt-extruded from a T-dye under a condition of 280° C. by means of a 50 mmφ extruder manufactured by Nippon Seiko K.K. to obtain a sheet having a thickness of 500 μm. Then, the sheet was stretched at 90° C. three times in MD (longitudinal direction) and three times in TD (transverse direction) to obtain a film of 55 μm. The stretchability and the dispersed particle size of the maleimide copolymer in the unstretched film and the apparent specific gravity, the three dimensional surface roughness, Hz, Tp, G%, the whiteness, the tensile strength and the writability of the stretched film are shown in Table 3. In a case where a polyethylene naphthalate resin was used as the crystalline polyester resin, the test was conducted at a film-forming temperature of 300° C. and a stretching temperature of 125° C. Likewise, the properties of the films are shown in Table 3.

TABLE 3

| | Polymers | Amounts (wt %) | Added polymer Tg (°C.) | Unstretched film Particle size (μm) | Stretching Temp. (°C.) | Stretch ratio (times) MD × TD | Stretch-ability |
|---|---|---|---|---|---|---|---|
| Example 1 | a-1 | 20 | 198 | 1–8 | 90 | 3 × 3 | Good |
| | b-1 | 80 | | | | | |
| Example 2 | a-2 | 20 | 198 | 1–10 | 90 | 3 × 3 | Good |
| | b-1 | 80 | | | | | |
| Example 3 | a-2 | 10 | 198 | 1–10 | 90 | 3 × 3 | Good |
| | b-1 | 90 | | | | | |
| Example 4 | a-2 | 30 | 198 | 1–10 | 90 | 3 × 3 | Good |
| | b-1 | 70 | | | | | |
| Example 5 | a-3 | 20 | 147 | 2–15 | 90 | 3 × 3 | Good |
| | b-1 | 80 | | | | | |
| Example 6 | a-4 | 20 | 147 | 1–2 | 90 | 3 × 3 | Good |
| | b-1 | 80 | | | | | |
| Example 7 | a-9 | 20 | 199 | 0.3–4 | 90 | 3 × 3 | Good |
| | b-1 | 80 | | | | | |
| Example 8 | a-10 | 20 | 198 | 1–4 | 90 | 3 × 3 | Good |
| | b-1 | 80 | | | | | |
| Example 9 | a-2 | 20 | 198 | 1–8 | 125 | 3 × 3 | Good |
| | b-2 | 80 | | | | | |

| | Stretched film | | | | | | | |
|---|---|---|---|---|---|---|---|---|
| | Specific gravity | Surface roughness SRa | SPc | Hz (%) | Tp | G % | White-ness | Strength (kg/mm²) | Write-ability |
| Example 1 | 0.85 | 0.25 | 50 | 85 | 1.5 | 3.1 | 98 | 14 | ◯ |
| Example 2 | 0.78 | 0.28 | 88 | 92 | 0.9 | 1.1 | 101 | 12 | ◉ |
| Example 3 | 0.98 | 0.28 | 51 | 86 | 1.6 | 2.8 | 97 | 13 | ◯ |
| Example 4 | 0.53 | 0.31 | 120 | 95 | 0.8 | 0.9 | 108 | 9 | ◉ |
| Example 5 | 0.84 | 0.25 | 49 | 84 | 1.5 | 3.1 | 97 | 15 | ◯ |
| Example 6 | 1.03 | 0.19 | 50 | 83 | 2.1 | 4.4 | 90 | 12 | ◯ |
| Example 7 | 0.78 | 0.28 | 87 | 93 | 0.8 | 1.0 | 102 | 11 | ◉ |
| Example 8 | 0.78 | 0.28 | 88 | 91 | 0.9 | 1.0 | 101 | 12 | ◉ |
| Example 9 | 0.79 | 0.30 | 89 | 93 | 1.0 | 0.9 | 101 | 13 | ◉ |

COMPARATIVE EXAMPLES 1 TO 10

In the same manner as the preceding Examples, pellets were dried and melt-extruded to obtain a film of 500 μm. Stretching was conducted under different stretching temperature conditions of 90° C., 60° C. and 200° C. Further, a stretching ratio of 1.2×1.0 time was adopted in addition to the stretching ratio of 3×3 times. Further, as the additional polymer, a polyphenylene oxide resin was used in comparison with the maleimide copolymer. The properties of the films are shown in Table 4.

TABLE 4

| | Polymers | Amounts (wt %) | Added polymer Tg (°C.) | Unstretched film Particle size (μm) | Stretching Temp. (°C.) | Stretch ratio (times) MD × TD | Stretch-ability |
|---|---|---|---|---|---|---|---|
| Comparative Example 1 | a-5<br>b-1 | 20<br>80 | 198 | 1–10 | 90 | 3 × 3 | Poor |
| Comparative Example 2 | a-6<br>b-1 | 20<br>80 | 128 | 2–18 | 90 | 3 × 3 | Good |
| Comparative Example 3 | a-7<br>b-1 | 20<br>80 | 113 | 1–4 | 90 | 3 × 3 | Good |
| Comparative Example 4 | a-8<br>b-1 | 20<br>80 | 147 | 2–6 | 90 | 3 × 3 | Good |
| Comparative Example 5 | a-2<br>b-1 | 3<br>97 | 198 | 0.5–8 | 90 | 3 × 3 | Good |
| Comparative Example 6 | a-2<br>b-1 | 55<br>45 | 198 | No particle | 90 | 3 × 3 | Poor |
| Comparative Example 7 | a-2<br>b-1 | 20<br>80 | 198 | 1–10 | 60 | 3 × 3 | Poor |
| Comparative Example 8 | a-2<br>b-1 | 20<br>80 | 198 | 1–10 | 200 | 3 × 3 | Poor |
| Comparative Example 9 | a-2<br>b-1 | 20<br>80 | 198 | 1–10 | 90 | 1.2 × 1 | Good |
| Comparative Example 10 | PPO<br>b-1 | 20<br>80 | 185 | 5–30 | 90 | 3 × 3 | Good |

| | Stretched film | | | | | | | |
|---|---|---|---|---|---|---|---|---|
| | Specific gravity | Surface roughness SRa | Surface roughness SPc | Hz (%) | Tp | G % | White-ness | Strength (kg/mm$^2$) | Write-ability |
| Comparative Example 1 | — | — | — | — | — | — | — | — | — |
| Comparative Example 2 | 1.20 | 0.11 | 41 | 75 | 4.1 | 6.5 | 85 | 17 | X |
| Comparative Example 3 | 1.25 | 0.11 | 40 | 68 | 4.5 | 8.2 | 82 | 18 | X |
| Comparative Example 4 | 1.24 | 0.10 | 23 | 61 | 5.4 | 12.1 | 81 | 19 | X |
| Comparative Example 5 | 1.30 | 0.09 | 15 | 45 | 28 | 23 | 81 | 18 | X |
| Comparative Example 6 | — | — | — | — | — | — | — | — | — |
| Comparative Example 7 | — | — | — | — | — | — | — | — | — |
| Comparative Example 8 | 1.30 | 0.09 | 15 | 45 | 28 | 25 | 82 | 15 | X |
| Comparative Example 9 | 1.30 | 0.01 | 3 | 20 | 70 | 98 | 75 | 5 | X |
| Comparative Example 10 | 0.78 | 0.30 | 95 | 95 | 0.8 | 0.9 | 70 | 6 | O |

The following facts are evident from Examples 1 to 9 and Comparative Examples 1 to 10.

Namely, it is evident that the film made of a composition comprising the crystalline polyester resin and the maleimide copolymer, wherein N-phenylmaleimide as the constituting component of the maleimide copolymer is 60 mol %, lacks in the thermal stability and is inferior in the stretchability, and that the film of a composition comprising the crystalline polyester resin and the maleimide copolymer wherein the N phenylmaleimide copolymer is 20 mol % and the film of a composition comprising the crystalline polyester resin and the maleimide copolymer wherein the unsaturated dicarboxylic acid or the methyl methacrylate resin is 60 mol %, lacks in the weight reduction, matte effect and whiteness. Further, it is evident that the film of a composition comprising the crystalline polyester resin and the maleimide copolymer wherein the maleimide copolymer is 3% by weight, likewise lacks in the weight reduction, matte effect and whiteness. It is further evident that the film of a composition comprising the crystalline polyester resin and the maleimide copolymer wherein the maleimide copolymer is 55% by weight, is inferior in the stretchability, and the size of the dispersed particles can not be ascertained. With respect to the stretching temperature, 90° C. is appropriate, but at 60° C., the film raptures and is inferior in the stretchability. When stretched at 200° C., it is evident that irregularity in the film thickness is substantial, and the quality of the film is remarkably poor, and the film lacks in the weight reduction, matte effect and whiteness. Also with respect to the stretching ratio, it is evident that at 1.2×1.0 time, the film lacks in the weight reduction, matte effect and whiteness. Further, from Comparative Example 10, it is evident that when the dispersed particles exceed 20 μm, the strength of the resulting film tends to be remarkably poor.

As specifically described in the Examples, to the polyester film of the present invention, excellent weight reduction, strength, heat resistance, shielding properties, writability and productivity are imparted by using the specific void-forming polymer. In this respect, the polyester film of the present invention is superior in the performance to the conventional light-weight polyesters.

We claim:

1. A light-weight polyester film which comprises (A) from 50 to 95% by weight of a crystalline polyester resin and (B) from 5 to 50% by weight of a maleimide copolymer, said maleimide copolymer being dispersed in the film in the form of particles having diameters of from 0.1 to 20 μm and fine voids being present in the film, and which has an apparent specific gravity of from 0.3 to 1.1, wherein said maleimide copolymer comprises from 30 to 50 mol % of a maleimide monomer group, from 30 to 70 mol % of an aromatic vinyl monomer group, from 0 to 40 mol % of an unsaturated dicarboxylic anhydride monomer group and from 0 to 50 mol % of other copolymerizable monomer group, and said maleimide copolymer has a glass transition temperature higher by at least 10° C. than the crystalline polyester resin.

2. The light-weight polyester film according to claim 1, wherein the crystalline polyester resin comprises residues of an aromatic dicarboxylic acid and residues of an aliphatic diol or an alicyclic diol, as main constituting components.

3. The light-weight polyester film according to claim 2, wherein the aromatic dicarboxylic acid is terephthalic acid, isophthalic acid, naphthalenedicarboxylic acid or a mixture thereof; the aliphatic diol is ethylene glycol, diethylene glycol, propylene glycol, butylene glycol, neopentyl glycol, or a mixture thereof; and the alicyclic diol is cylohexylene dimethanol.

4. The light-weight polyester film according to claim 1, wherein the crystalline polyester resin is polyethylene terephthalate, polybutylene terephthalate, polyethylene naphthalate, polycyclohexylenedimethylene terephthalate or a mixture thereof.

5. The light-weight polyester film according to claim 1, wherein the crystalline polyester resin has an intrinsic viscosity of at least 0.4 dl/g as measured at 25° C. in a solvent mixture of phenol/tetrachloroethane=1/1 (weight ratio).

6. The light-weight polyester film according to claim 1, wherein the maleimide monomer is maleimide, N-methylmaleimide, N-ethylmaleimide, N-propylmaleimide, N-hexylmaleimide, N-cyclohexylmaleimide, N-phenylmaleimide, N-tolylmaleimide, N-(halogenated phenyl)maleimide, N-(hydroxyphenyl)maleimide, N-naphthylmaleimide, N-(hydroxyphenyl)maleimide, N-naphthylmaleimide, α-chloro-N-phenylmaleimide, α-methyl-N phenylmaleimide or a mixture thereof.

7. The light-weight polyester film according to claim 1, wherein the aromatic vinyl monomer is styrene, α-methylstyrene, vinyl toluene, t-butylstyrene, halogenated styrene or a mixture thereof.

8. The light-weight polyester film according to claim 1, wherein the unsaturated dicarboxylic anhydride monomer is maleic anhydride, methylmaleic anhydride, 1,2-dimethylmaleic anhydride, ethylmaleic anhydride, phenylmaleic anhydride or a mixture thereof.

9. The light-weight polyester film according to claim 1, wherein said other copolymerizable monomer is methyl (meth)acrylate, ethyl (meth)acrylate, butyl (meth)acrylate, hexyl (meth)acrylate, cyclohexyl (meth)acrylate, decyl (meth)acrylate, octadecyl (meth)acrylate, hydroxyethyl (meth)acrylate, methoxyethyl (meth)acrylate, glycidyl (meth)acrylate or a mixture thereof.

10. A process for producing a light-weight polyester film, which comprises melt-extruding a composition comprising (A) from 50 to 95% by weight of a crystalline polyester resin and (B) from 5 to 50% by weight of a maleimide copolymer to obtain an unstretched polyester film, and at least monoaxially stretching the polyester film at least 1.5 times within a temperature range of at least the glass transition temperature of the crystalline polyester resin and at most the crystallization temperature of the crystalline polyester resin.

* * * * *